UNITED STATES PATENT OFFICE.

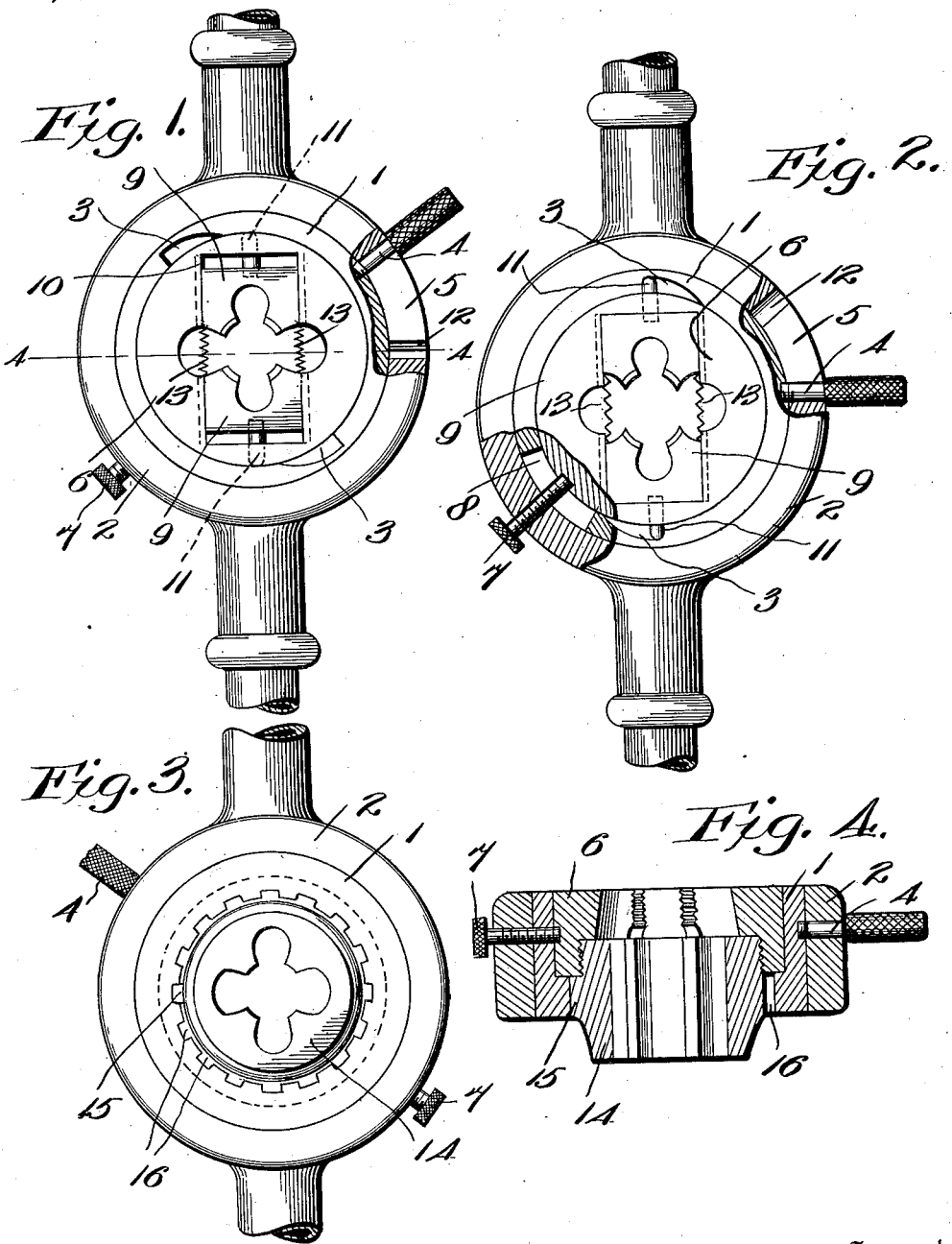

CHARLES C. RUSSELL, OF GREENFIELD, MASSACHUSETTS, ASSIGNOR TO RUSSELL MANUFACTURING COMPANY, OF GREENFIELD, MASSACHUSETTS, A CORPORATION OF MASSACHUSETTS.

SCREW-PLATE.

1,091,167.        Specification of Letters Patent.     Patented Mar. 24, 1914.

Application filed December 19, 1912, Serial No. 737,727. Renewed August 18, 1913. Serial No. 785,363.

*To all whom it may concern:*

Be it known that I, CHARLES C. RUSSELL, a citizen of the United States, residing at Greenfield, in the county of Franklin and State of Massachusetts, have invented certain new and useful Improvements in Screw-Plates; and I do hereby declare the following to be a full, clear, and exact description of the invention, such as will enable others skilled in the art to which it appertains to make and use the same.

My invention relates to screw-plates, and it consists in the construction, combinations and arrangements herein described and claimed.

An object of my invention is to provide an improved screw-plate having means for automatically unlocking the die-members and quickly shifting the latter to open position upon the completion of a thread.

A further object of my invention is to provide an improved screw-plate having a rotatable cam member for automatically closing and locking the die-members in an accurately adjusted position by a single movement.

In the accompanying drawings forming a part of this application, and in which similar reference symbols indicate corresponding parts in the several views: Figure 1 is a rear face view, partly broken away, illustrating one embodiment of my invention with the die-members in their closed position; Fig. 2 is a similar view showing the die-members shifted to their open position; Fig. 3 is a front face view of the construction shown in Figs. 1 and 2; and Fig. 4 is a section on the line 4—4 of Fig. 1.

Referring to the drawings, 1 indicates a ring rotatably mounted in a stock 2 and provided with cam faces 3; a pin 4 extending through a slot 5 in the stock and being threaded in said ring for rotating the latter. The collet 6 is rigidly secured to the stock 2 within said ring 1, by a screw 7 threaded in said stock and collet and extending through a slot 8 in the ring 1 to permit rotation of the latter. A pair of die-members 9 are slidably mounted in undercut channels 10 in said collet, and provided with projections 11 engaging the cam ring 1. Any suitable means may be employed for securing a delicate adjustment of the die-members, such as by screwing the projections 11 in or out of the die-members.

The slot 5 in the stock is so proportioned that when the pin 4 engages one end thereof, the inner periphery of the ring 1 will engage the projections 11 for closing the die-members, as shown in Fig. 1, and when said pin 4 is at the other end of the slot 5 the deepest portion of the cam faces 3 will engage said projections 11 for permitting shifting of the die-members to open position, as shown in Fig. 2. The pin 4 is shown with flattened sides slidably fitting the slot 5; said pin being adapted to be turned through 90° in enlargements 12 at the respective ends of said slot for locking the rotatable cam ring 1 firmly in its two extreme positions.

Any suitable means may be employed for maintaining the projections 11 in engagement with the cam ring 1, such as springs 13 confined between the die-members 9; if desired, the springs could be omitted by providing the projections 11 with offsets fitting within cam grooves in said ring 1. A guide 14 is threaded in the collet 6 for engaging the die-members 9 to firmly clamp the latter in their closed position against the undercut walls of the collet channels 10. I have shown the guide 14 provided with a tooth 15 adapted to engage within a series of recesses 16 in the cam ring 1, to adjustably connect the guide to said ring for rotation with the latter. It will be obvious that the guide 14 could be rigidly secured to, or formed integral with, the rotatable cam ring 1, if desired.

From the above description, it will be clear that upon rotation of the cam ring 1 from the position shown in Fig. 1, the guide 14 will be screwed downwardly in the collet 6 to release the die-members 9 from the clamping action of said guide, and the lowest portions of the faces 3 will be shifted into engagement with the projections 11 to permit opening of the die-members, as shown in Fig. 2. The reverse of this operation takes place when the cam ring is shifted in the opposite direction from the open position shown in Fig. 2.

I have illustrated and described preferred and satisfactory constructions, but changes could be made within the spirit and scope of my invention.

I claim:—

1. In a screw-cutting device, a stock, a collet rigidly secured therein, die-members adjustably mounted in said collet, and means rotatably mounted in said stock for opening and closing said die-members and locking the latter in their closed position.

2. In a screw-cutting device, a stock, a collet rigidly secured therein, a ring rotatably mounted in said stock and provided with cam faces, die-members adjustably mounted in said collet and provided with projections engaging said cam faces, means for rotating said ring to open and close said die-members, a guide on said collet, and connections between said rotatable ring and guide for automatically shifting the latter into clamping engagement with said die-members in the closed position of the latter.

3. In a screw-cutting device, a stock, a collet rigidly secured therein, a ring rotatably mounted in said stock and provided with cam faces, die-members adjustably mounted in said collet and provided with projections engaging said cam faces, a guide threaded in said collet, and means for simultaneously rotating said ring and guide for opening and closing said die-members and clamping the latter in their closed position.

In testimony whereof, I affix my signature, in presence of two witnesses.

CHARLES C. RUSSELL.

Witnesses:
ARCHIBALD D. FLOWERS,
CHARLES W. NIMS.

Copies of this patent may be obtained for five cents each, by addressing the "Commissioner of Patents, Washington, D. C."